US012812526B2

(12) United States Patent
Hong et al.

(10) Patent No.: US 12,812,526 B2
(45) Date of Patent: Nov. 24, 2026

(54) METHODS, SYSTEMS, AND APPARATUS FOR SELECTING A SERVING CELL USING A LOW POWER WAKE-UP RADIO

(71) Applicant: InterDigital Patent Holdings, Inc., Wilmington, DE (US)

(72) Inventors: Jongwoo Hong, New York, NY (US); Young Woo Kwak, Woodbury, NY (US); Brian Martin, Farnham (GB); Moon IL Lee, Melville, NY (US); Nazli Khan Beigi, Longueuil (CA); Prasanna Herath, Laval (CA); Virgile Garcia, Antibes (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 290 days.

(21) Appl. No.: 18/777,989

(22) Filed: Jul. 19, 2024

(65) Prior Publication Data

US 2026/0025751 A1 Jan. 22, 2026

(51) Int. Cl.
*H04W 48/20* (2009.01)
*H04W 48/16* (2009.01)

(52) U.S. Cl.
CPC ........... *H04W 48/20* (2013.01); *H04W 48/16* (2013.01)

(58) Field of Classification Search
CPC . H04W 36/0085; H04W 48/16; H04W 48/20; H04W 88/06
See application file for complete search history.

(56) References Cited

U.S. PATENT DOCUMENTS

2023/0397117 A1* 12/2023 Pan .................. H04W 52/0235
2024/0267849 A1* 8/2024 Lu ......................... H04W 76/19
2024/0357497 A1* 10/2024 Koskinen ............. H04W 76/28
2025/0261114 A1* 8/2025 Fu .......................... H04W 4/50
(Continued)

FOREIGN PATENT DOCUMENTS

CN 117693960 A 3/2024
WO 2024148554 A1 7/2024

OTHER PUBLICATIONS

Lenovo, "RRM measurement relaxation and offloading in RRC_IDLE/INACTIVE," 3GPP TSG-RAN WG2 Meeting #1256, R2-2404808, Fukuoka, Japan (May 20-24, 2024).
(Continued)

*Primary Examiner* — Kashif Siddiqui
(74) *Attorney, Agent, or Firm* — Volpe Koenig

(57) ABSTRACT

A wireless transmit/receive unit (WTRU) is disclosed. The WTRU may comprise a first radio, a second radio, and a processor. The processor may be configured to perform a first measurement of a first downlink signal and determine a first quality of a serving cell based on the first measurement. The processor may also be configured to perform a second measurement of a second downlink signal based at least in part on the first quality of serving cell exceeding a first threshold value. Further, the processor may also be configured to determine a second quality of the serving cell based on the second measurement. In addition, the processor may also be configured to determine a measurement configuration of at least one neighbor cell based at least in part on the second quality of the serving cell exceeding a second threshold value or a third threshold value and perform cell reselection.

24 Claims, 8 Drawing Sheets

(56) References Cited

U.S. PATENT DOCUMENTS

| | | | | |
|---|---|---|---|---|
| 2025/0267583 A1* | 8/2025 | Li | ........................ | H04W 48/20 |
| 2025/0310800 A1* | 10/2025 | Cozzo | ................... | H04W 24/04 |
| 2026/0059449 A1* | 2/2026 | Turtinen | ............... | H04W 48/12 |

OTHER PUBLICATIONS

CMCC, "New WID: Low-power wake-up signal and receiver for NR (LP-WUS/WUR)," 3GPP TSG RAN Meeting #102, RP-234056, Edinburgh, GB (Dec. 11-15, 2023).

Third Generation Partnership Project, "Technical Specification Group Radio Access Network; NR; Requirements for support of radio resource management (Release 18)," 3GPP TS 38.133 V18.5.0 (Mar. 2024).

Third Generation Partnership Project, "Technical Specification Group Radio Access Network; NR; Radio Resource Control (RRC) protocol specification (Release 18)," 3GPP TS 38.331 V17.8.0 (Mar. 2024).

Third Generation Partnership Project, "Technical Specification Group Radio Access Network; NR; Radio Resource Control (RRC) protocol specification (Release 18)," 3GPP TS 38.331 V18.1.0 (Mar. 2024).

Third Generation Partnership Project, "Technical Specification Group Radio Access Network; NR; User Equipment (UE) procedures in Idle mode and RRC Inactive state (Release 18)," 3GPP TS 38.304 V18.1.0 (Mar. 2024).

* cited by examiner

METHODS, SYSTEMS, AND APPARATUS FOR SELECTING A SERVING CELL USING A LOW POWER WAKE-UP RADIO

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth-generation (4G) long-term evolution (LTE). Wireless communication devices may establish communications with other devices and data networks, e.g., via an access network, such as a radio access network (RAN).

SUMMARY

Methods and apparatus for selecting or determining a serving cell using a low power wake-up radio are described. In one aspect, a method implemented by a wireless transmit/receive unit (WTRU) is disclosed. The method may include receiving a first downlink signal at a first radio, performing a first measurement of the first downlink signal, and determining a first quality of a serving cell based on the first measurement. The method may also include receiving a second downlink signal at a second radio. The second downlink signal may include the first downlink signal or another downlink signal. Further, the method may include performing a second measurement of the second downlink signal based at least in part on the first quality of serving cell exceeding a first threshold value and determining a second quality of the serving cell based on the second measurement. In addition, the method may include determining a measurement configuration of at least one neighbor cell based at least in part on the second quality of the serving cell exceeding a second threshold value or a third threshold value and performing cell reselection.

In another aspect, a wireless transmit/receive unit (WTRU) is disclosed. The WTRU may comprise a first radio configured to receive a first downlink signal, a second radio configured to receive a second downlink signal, and a processor. The processor may be configured to perform a first measurement of the first downlink signal and determine a first quality of a serving cell based on the first measurement. The processor may also be configured to perform a second measurement of the second downlink signal based at least in part on the first quality of serving cell exceeding a first threshold value. Further, the processor may be configured to determine a second quality of the serving cell based on the second measurement. In addition, the processor may also be configured to determine a measurement configuration of at least one neighbor cell based at least in part on the second quality of the serving cell exceeding a second threshold value or a third threshold value and perform cell reselection.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
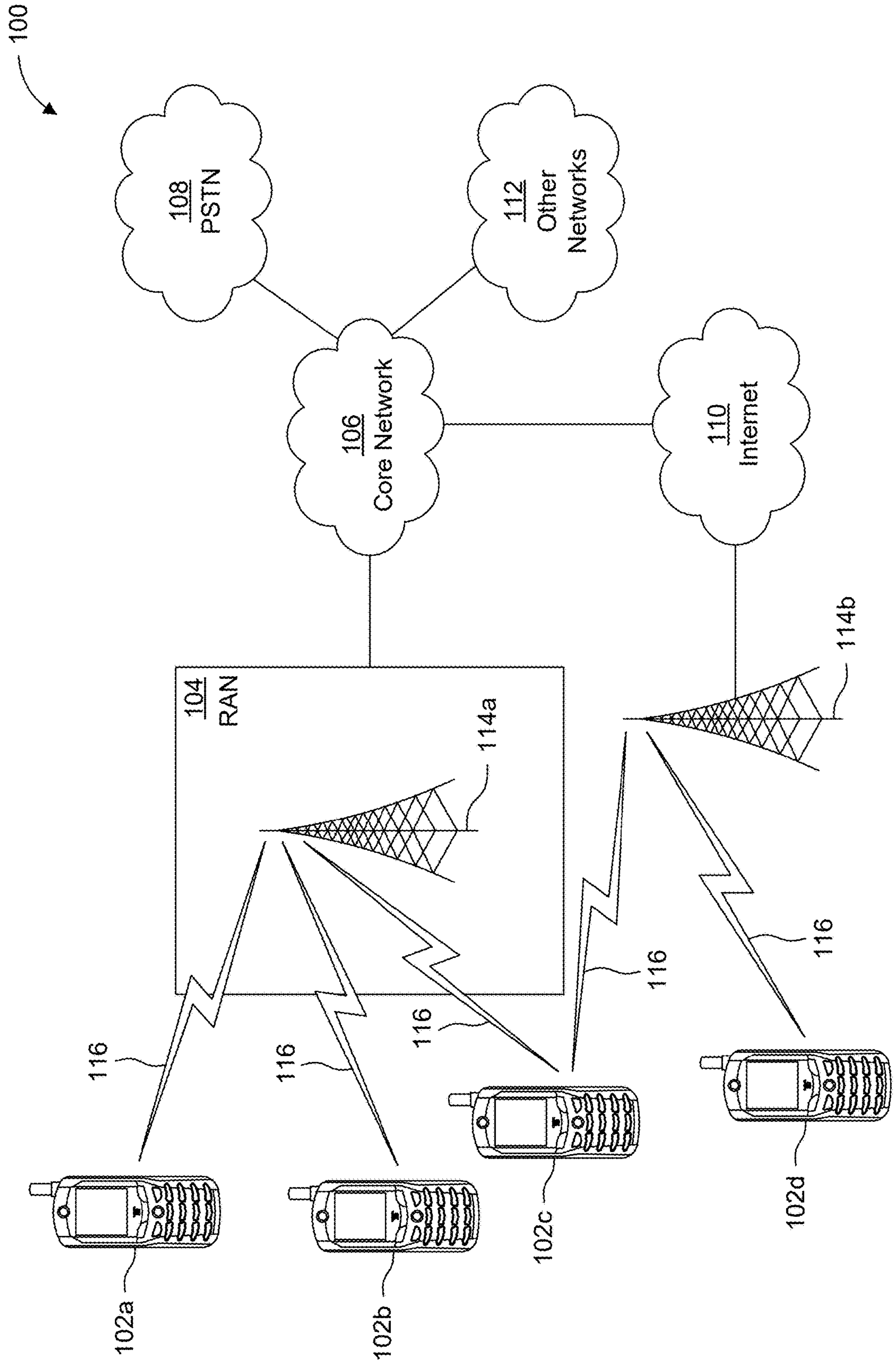
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) **102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102***a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
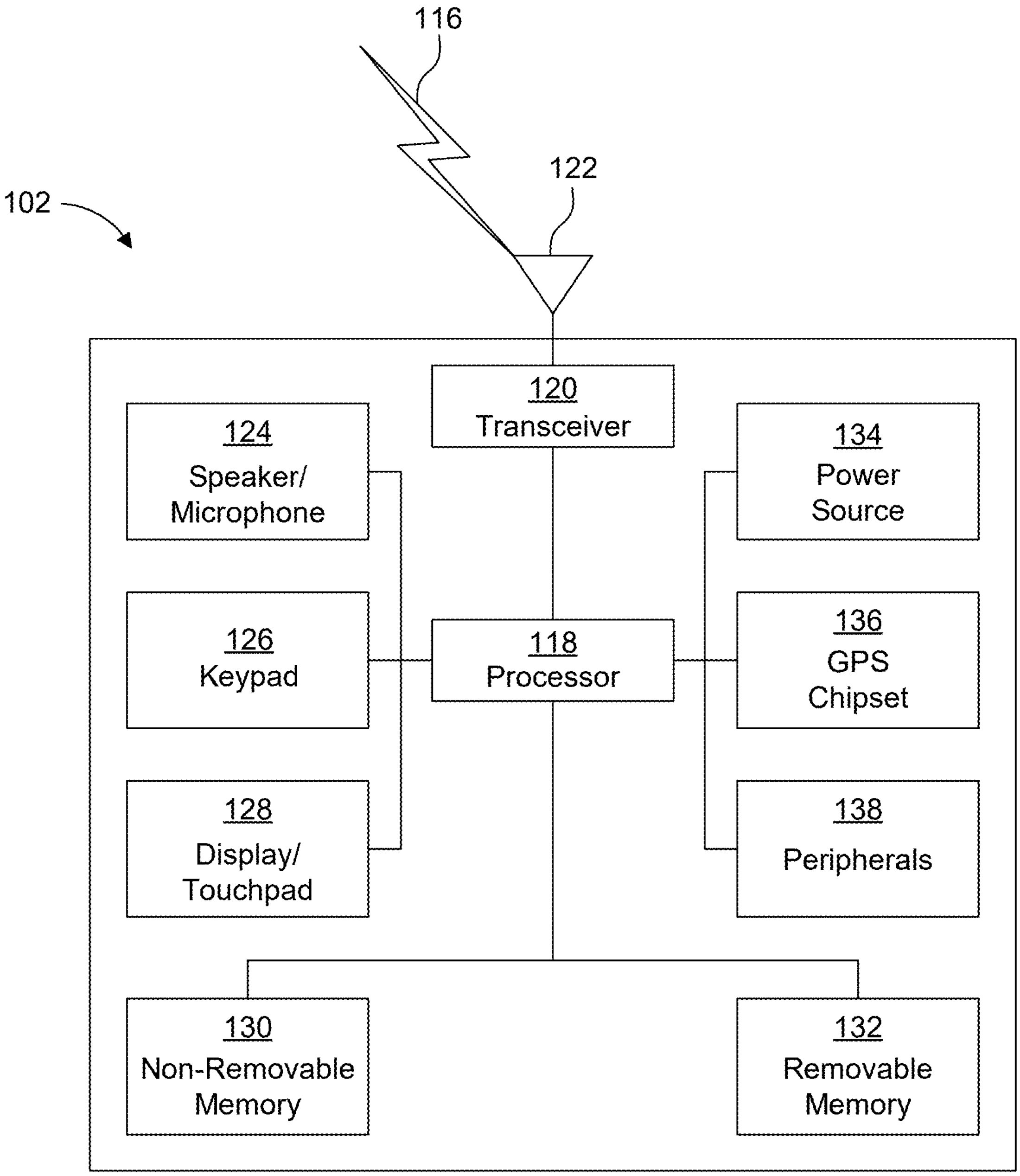
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
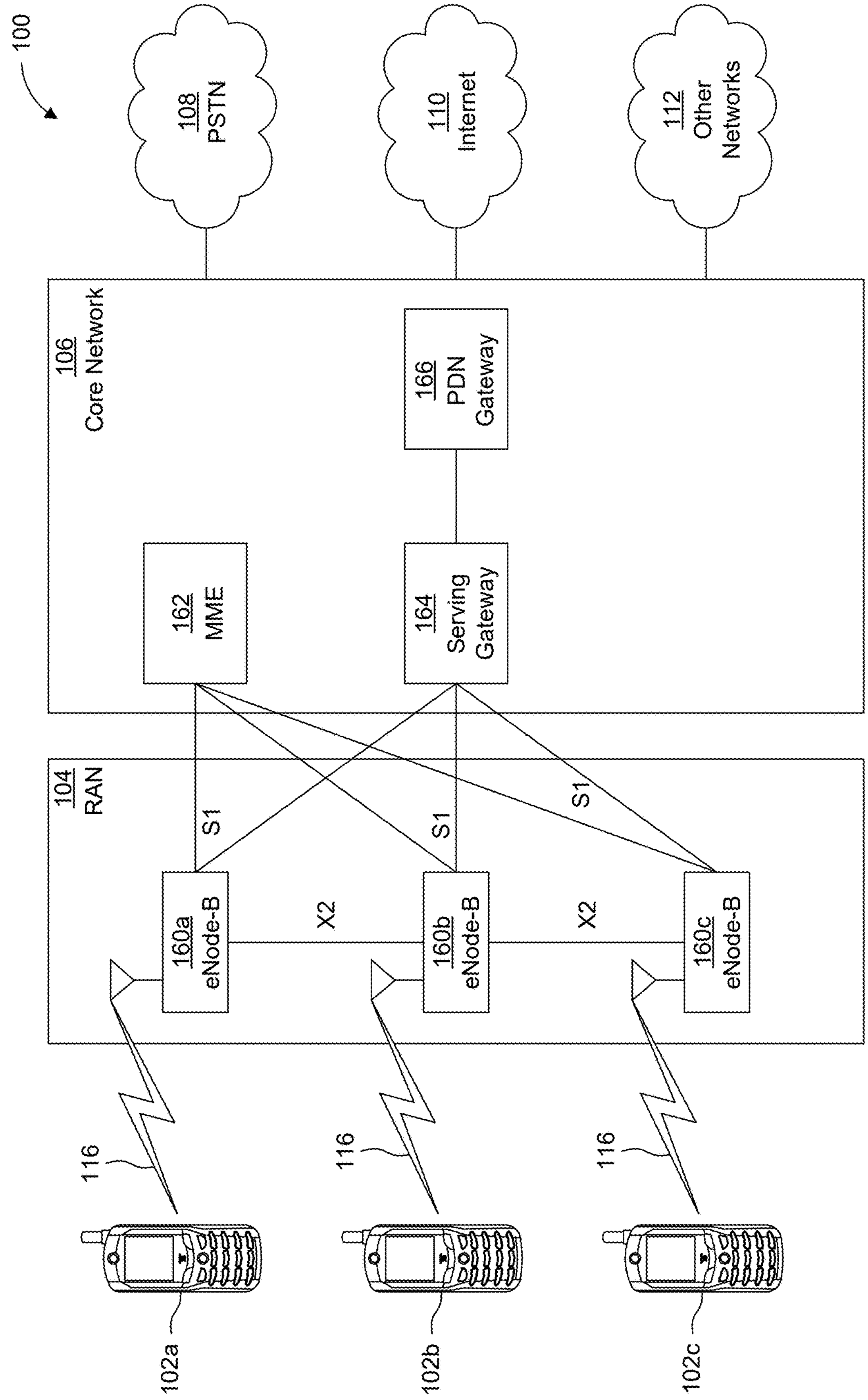
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the SI interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
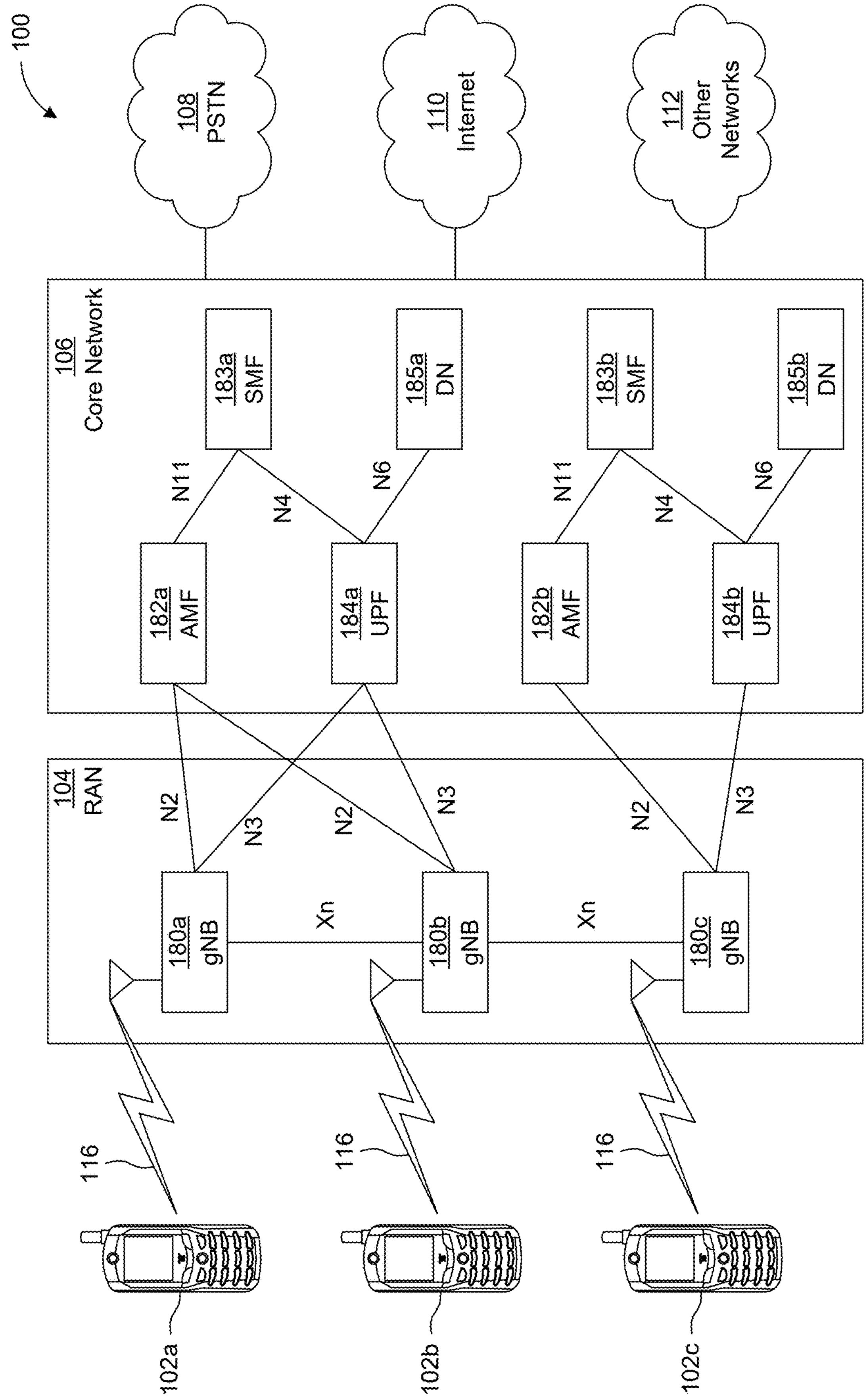
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
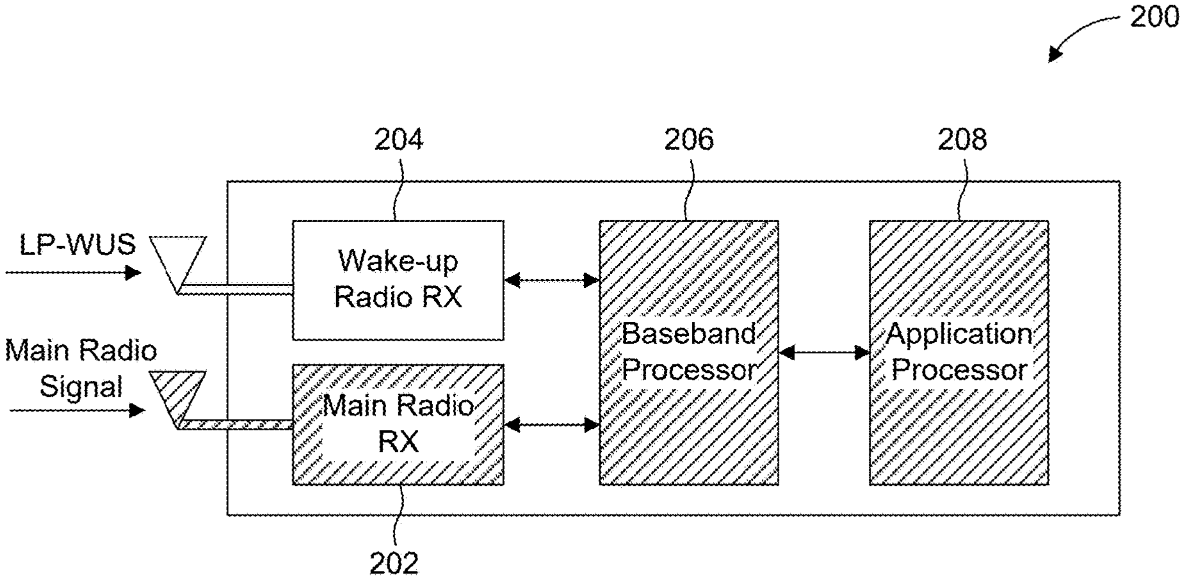
FIG. 2 illustrates a wireless transmit/receive unit, according to one exemplary embodiment.

Referring now to FIG. 2, an exemplary WTRU 200 is Illustrated. The WTRU 200 may have a first radio and a second radio. The first radio may be a main radio (MR) 202 and the second radio may be a low power wake-up radio 204 (LP-WUR). The type of LP-WUR 204 (e.g., the second radio) may be a OOK-based radio or receiver or a OFDM-based radio or receiver. The LP-WUR 204 can reduce power consumption of the WTRU 200. For example, the LP-WUR 204 can monitor wake-up signals (WUSs) and trigger and/or wake-up the MR 202 dedicated for data and control signal transmission/reception. The WTRU 200 may also include a baseband processor 206 and an application processor 208.

The LP-WUR 204 of the WTRU 200 may be configured with monitoring windows to monitor and detect potential LP-WUSs. The LP-WUR 204 may be configured with a duty cycle for the monitoring situations, where the duty cycle and the monitoring windows should be selected to match with LP-WUS transmission time from a Network (NW) or base station. The time and frequency synchronization of the WTRU are based on receiving Synchronization Signal Blocks (SSB) and using Primary Synchronization Signal (PSS) and/or Secondary Synchronization Signal (SSS) for synchronization.

The WTRU 200 may receive the SSBs during an "ON mode" of the MR 202, where the WTRU may use the received SSB for synchronization. However, in cases where the MR 202 is configured with a long "OFF mode" or sleeping periods, the clock frequency may drift at the WTRU 200. The clock frequency drift or frequency error may result in inaccuracy in the duty cycle of the LP-WUR 204. The difference in NW's clock and LP-WUR's clock frequency may result in time mismatch between the LP-WUS transmission time from NW and LP-WUR's monitoring window. The time mismatch may lead to failed detection of LP-WUS.

To avoid the time mismatch between the LP-WUS transmission time from NW and LP-WURs monitoring window, the WTRU 200 may be configured to detect and receive periodic Low Power Synchronization Signals (LP-SS) to achieve accurate synchronization at the LP-WUR 204. LP-SS could be based on On-Off Keying (OOK) symbols forming binary sequences, where the WTRU 200 with a LP-WUS configuration may use the LP-WUR 204 (e.g., based on OOK receivers) to detect and receive LP-SS.

The LP-SS may be used for time and frequency synchronization with the serving cell. Moreover, the WTRU 200 may use the LP-SS for RRM measurements. As such, the NW may configure the LP-SS sequence associated to the serving cell in addition to a number of candidate LP-SS sequences associated with one or more neighbor cells, where the WTRU 200 can measure RRM measurements accordingly, for the serving cell and configured neighbor cells, respectively.

The WTRU 200 may be configured to measure downlink (DL) signals by via the MR 202 (e.g., first radio) and/or the LP-WUR 204 (e.g., second radio). The type of the LP-WUR 204 may be a OFDM-based radio or receiver. The MR 202 may measure a first downlink (DL) signal via the MR 202 (e.g., first radio). The first DL signal may include at least one of DL signal (e.g., SS/PBCH/SSB/SSS). For example, the WTRU 200 may receive a synchronization signal/physical broadcast channel (SS/PBCH) block. The SS/PBCH block (SSB) may include a primary synchronization signal (PSS), a secondary synchronization signal (SSS), and a physical broadcast channel (PBCH). The WTRU may monitor, receive, or attempt to decode one or more SSBs during initial access, initial synchronization, radio link monitoring (RLM), cell search, cell switching, and so forth. The measurement value of the first DL signal received by the MR 202 (e.g., first radio) may include one or more measurement values (e.g., SS-RSRP and/or SS-RSRQ and/or SS-SINR).

The WTRU 200 may be configured to measure a second downlink (DL) signal via the LP-WUR 204 (e.g., second radio). The WTRU 200 may measure the second DL signal via the LP-WUR 204 when the LP-WUR 204 is OOK-based (e.g., OOK-1 or OOK-4 with M-1,2,4) or OFDM-based. The second DL signal may include at least one DL signal (e.g., LP-SS, OOK symbols, LP-WUS, etc. The measurement value of the second DL signal received by the LP-WUR 204 may include one or more measurement values (e.g., LP-RSSI and/or LP-RSRP and/or LP-RSRQ and/or LP-SINR).

Figure 3:
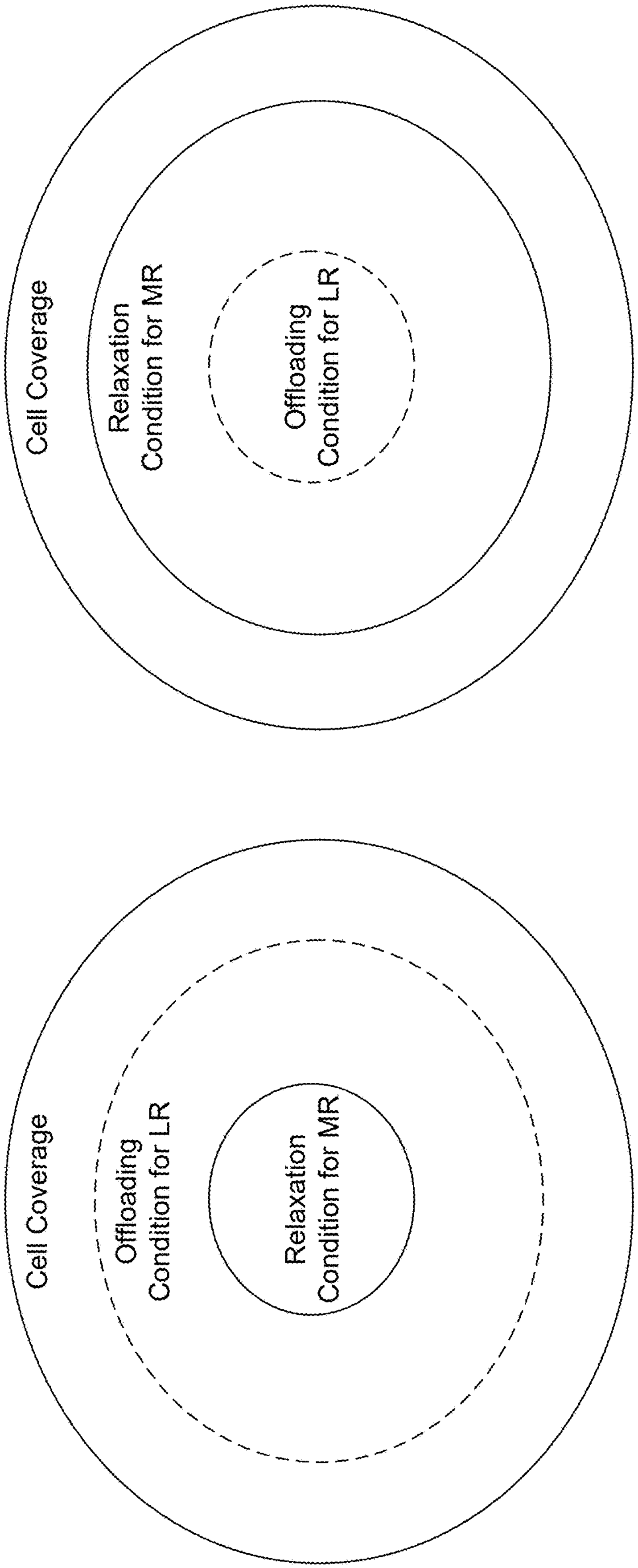
FIG. 3 illustrates an example of different conditions for offloading and relaxation.

The WTRU 200 may be configured to determine offloading conditions and relaxation. Relaxation may indicate a relaxed RRM measurement of a neighboring (or serving cell) measurement while measuring via the MR 202 (e.g., first radio) and/or LP-WUR 204 (e.g., second radio). The offloading condition may indicate to the WTRU 200 to switch from the MR 202 (e.g., first radio) to the LP-WUR 204 (e.g., second radio) based on a serving cell measurement via the LP-WUR (e.g., second radio). FIG. 3 shows examples of different condition of offloading and relation. For example, when an offloading condition of the serving cell is satisfied by MR 202, then a serving cell measurement may be performed by LP-WUR 204. To achieve power saving gains with neighboring cell measurement, the WTRU 200 may determine whether to relax or not the neighboring cell measurement of MR 202 based on the measurement results with LR (e.g., quality of the LR measurements) as further described below. The relaxation condition of neighboring cell measurement may be related to reception of level/quality of serving cell measurement (i.e., Srxlev/Squal).

The WTRU 200 may determine measurements of intra-frequency cells, NR inter-frequency cells, and/or inter-RAT frequency cells according to measurement rules or procedures based on the current Srxlev value (e.g., cell selection RX level value) of the serving cell and/or the current Squal value (e.g., cell selection quality value) of the serving cell. The Srxlev value may indicate a RSRP value (e.g., SS-RSRP/LP-RSRP) and the Squal value may indicate RSRQ value (e.g., SS-RSRQ/LP-RSRQ). The WTRU 200 may not determine intra-frequency measurements based on the measurement results. For example, the measurement results of the serving cell may fulfil Srxlev>$S_{IntraSearchP}$ and/or Squal>$S_{IntraSearchQ}$.

The WTRU 200 may determine intra-frequency measurements based on the measurement results. For example, the measurement results of the serving cell may fulfil Srxlev<$S_{IntraSearchP}$ and/or Squal<$S_{IntraSearchQ}$. The WTRU 200 may not perform measurements of NR inter-frequency cells of equal or lower priority, or inter-RAT frequency cells of lower priority based on the measurement results. For example, the measurement results of the serving cell may fulfil Srxlev>$S_{nonIntraSearchP}$ and/or Squal>$S_{nonIntraSearchQ}$ . . . . The WTRU 200 may perform measurements of NR inter-frequency cells of equal or lower priority, or inter-RAT frequency cells of lower priority based on the measurement results. For example, the measurement results of the serving cell may fulfil Srxlev<$S_{nonIntraSearch\ P}$ and/or Squal<$S_{nonIntraSearchQ}$.

When measuring the serving cell, the WTRU 200 may measure the SS-RSRP (or LP-RSRP) and/or SS-RSRQ (or LP-RSRQ) level of the serving cell and evaluate the cell selection criterion S for the serving cell. In some embodiments, M1=2 if SMTC periodicity ($T_{SMTC}$)>20 ms and DRX cycle≤0.64 second, otherwise M1=1). The WTRU 200 may filter the SS-RSRP (or LP-RSRP) and/or SS-RSRQ (or LP-RSRQ) of the serving cell using the measurements. For example, the WTRU 200 may filter the SS-RSRP (or LP-RSRP) and/or SS-RSRQ (or LP-RSRQ) of the serving cell within the set of measurements used for the filtering. At least two of the measurements may be spaced by, at least eDRX_IDLE cycle/2y, if the WTRU 200 is configured with eDRX cycle≤10.24s; otherwise DRX cycle/2.

For intra-cell measurements, the WTRU 200 may identify new intra-frequency cells and determine SS-RSRP (or LP-RSRP) and/or SS-RSRQ (or LP-RSRQ) measurements of the identified intra-frequency cells (without an explicit intra-frequency neighbor list containing physical layer cell identities). The WTRU 200 may identify the new intra-frequency based on the measurement results. For example, the WTRU 200 may evaluate whether a newly detectable intra-frequency cell meets the reselection criteria within $T_{detect,NR\_Intra}$ when $T_{reselection}$=0. In some embodiments, the WTRU 200 may measure SS-RSRP (or LP-RSRP) and/or SS-RSRQ (or LP-RSRQ) at $T_{measure,\ NR\_Intra}$ for intra-frequency cells that are identified and measured according to the measurement rules as described above. The WTRU 200 may filter the SS-RSRP (or LP-RSRP) and/or SS-RSRQ (or LP-RSRQ) measurements of each measured intra-frequency cell using the measurements. In some embodiments, the WTRU 200 may not consider a NR neighbor cell for cell reselection, if it is indicated as not allowed in the measurement control system information of the serving cell.

For inter cell measurements, the WTRU 200 may identify new inter-frequency cells and may determine SS-RSRP (or LP-RSRP) and/or SS-RSRQ (or LP-RSRQ) measurements of identified inter-frequency cells if carrier frequency information is provided by the serving cell, even if no explicit neighbor list with a physical layer cell identities is provided. The WTRU 200 may search for inter-frequency layers of higher priority $T_{higher\_priority\_search}$ if the results of the measurement are satisfied (i.e., $S_{rxlev}>S_{nonIntraSearchP}$ and/or $S_{qual}>S_{nonIntraSearchQ}$). The WTRU 200 may also search for and measure inter-frequency layers of higher, equal or lower priority in preparation for possible reselection. In some embodiments, the results of the measurement may be satisfied when $S_{rxlev}\leq S_{nonIntraSearchP}$ Or $S_{qual}\leq S_{nonIntraSearchQ}$.

The WTRU 200 may determine a relaxed RRM measurement while performing intra-frequency measurements, NR inter-frequency cells of equal or lower priority, or inter-RAT frequency cells of lower priority if one or more conditions (e.g., low mobility) are satisfied. The relaxed measurement criterion for the WTRU 200 with low mobility may be fulfilled when (SrxlevRef−Srxlev)<$S_{SearchDeltaP}$.) In some embodiments, a condition may be satisfied after selecting and/or reselecting a new cell and/or if ($S_{rxlev}$−SrxlevRef)>0, and/or if the relaxed measurement criterion has not been met for $T_{Search\ DeltaP}$. In some embodiments, a condition (e.g., not cell edge condition) may be satisfied when Srxlev>$S_{search\ ThresholdP}$ and/or Squal>$S_{SearchThresholdQ}$, if $S_{Search\ ThresholdQ}$ is configured.

The relaxed RRM measurement may be determined or considered when a condition (e.g., cell re-selection procedure and relaxation threshold) is satisfied to the quality of the serving cell measurement. The WTRU 200 may determine the relaxed RRM measurement for intra frequency if the serving cell fulfils Srxlev<$S_{IntraSearchP}$ and/or Squal<$S_{IntraSearchQ}$ and/or the measurement results (e.g., serving cell measurements via second radio) is above the relaxation threshold. The WTRU 200 may determine the relaxed RRM measurement for inter-frequency if the serving cell fulfils Srxlev<$S_{nonIntraSearchP}$ and/or Squal<$S_{nonIntraSearchQ}$ and/or the measurement results (e.g., serving cell measurements via second radio) is above the relaxation threshold. The relaxation threshold may indicate one or more conditions, such as, for example, low mobility, not-at-cell edge condition, and/or another criteria and conditions.

For priority handling of reselection, the WTRU 200 may be configured with one or more frequencies and associated priorities. The absolute priorities of different NR frequencies or inter-RAT frequencies may be provided to the WTRU 200 in the system information, in the RRCRelease message, or by inheriting from another RAT at inter-RAT cell (re) selection. The NR frequency or inter-RAT frequency may be listed (e.g., in system information) without providing a priority (i.e. the field cellReselectionPriority is absent for that frequency). If any fields with cellReselectionPriority or nsag-CellReselection Priority are provided in dedicated signaling, the UE may ignore any fields with cellReselection Priority and nsag-CellReselectionPriority provided in system information. When the UE 20 is camped in a normal state and has only dedicated priorities other than for the current frequency, the WTRU 200 may consider the current frequency to be the lowest priority frequency (i.e. lower than any of the network configured values). When the WTRU 200 is in a High-mobility state and is HSDN capable, the WTRU 200 may always consider the HSDN cells to be the highest priority (i.e., higher than any other network configured priorities). When the WTRU 200 is not in High-mobility state and is HSDN capable, the WTRU 200 may consider or configure HSDN cells to be the lowest priority (i.e., lower than any other network configured priorities).

When the WTRU 200 is configured to perform both NR sidelink communication and V2X sidelink communication, the WTRU 200 may consider the frequency providing both NR sidelink communication configuration and V2X sidelink communication configuration to be the highest priority. When the WTRU 200 is configured to perform NR sidelink communication and not perform V2X communication, the WTRU 200 may consider the frequency providing NR sidelink communication configuration to be the highest priority. When the WTRU 200 is configured to perform V2X sidelink communication and not perform NR sidelink communication, the WTRU 200 may consider the frequency providing V2X sidelink communication configuration to be the highest priority. When the WTRU 200 is configured to perform ranging/sidelink positioning, the WTRU 200 may consider the frequency providing ranging/sidelink positioning configuration to be the highest priority.

For reselection with priority, the WTRU 200 may apply rules for NR inter-frequencies and inter-RAT frequencies which are indicated in system information and for which the WTRU 200 has priority. For example, when a NR inter-frequency or inter-RAT frequency with a reselection priority higher than the reselection priority of the current NR frequency, the WTRU 200 may perform measurements of higher priority NR inter-frequency or inter-RAT frequencies. When a NR inter-frequency with an equal or lower reselection priority than the reselection priority of the current NR frequency and for inter-RAT frequency with lower reselection priority than the reselection priority of the current NR frequency, the WTRU 200 may perform measurements of NR inter-frequency cells of equal or lower priority, or inter-RAT frequency cells of lower priority when one or more conditions are satisfied (e.g., serving cell fulfils $S_{rxlev}<S_{nonIntraSearchP}$ and Squal<$S_{nonIntraSearchQ}$). When a NR inter-frequency with an equal or lower reselection priority than the reselection priority of the current NR frequency and for inter-RAT frequency with lower reselection priority than the reselection priority of the current NR frequency, the WTRU 200 may choose not to perform measurements of NR inter-frequency cells of equal or lower priority, or inter-RAT frequency cells of lower priority when one or more conditions are not satisfied (e.g., serving cell fulfils Srxlev>$S_{nonIntraSearchP}$ and Squal>$S_{nonIntraSearchQ}$).

For cell (re) selection, the WTRU 200 may receive a physical broadcast channel (PBCH). The PBCH may be part of an SS/PBCH block (SSB). The PBCH may carry system information. The PBCH may include or carry a master information block (MIB). The MIB include content, information, payload, and/or bits carried by the PBCH. Upon detection and/or reception of an SS/PBCH block, the WTRU 200 may use the information in MIB on the time and/or frequency resources to find one or more system information blocks (SIB). The SIB may include content, information, payload, and/or bits. One or more cell (re) selection parameters may be broadcasted in SIB (e.g., SIB1, SIB2, SIB3, and so forth), where the WTRU 200 may detect and/or receive from the serving and/or the neighbour detected cells.

The WTRU 200 may perform cell selection with or without stored cell information. The cell information may include frequencies and/or cell parameters. A cell may be a combination of one or more uplink component carriers (CC) and one or more downlink component carriers. The WTRU 200 may have stored information on one or more cells based on previously received measurement control information elements or from previously detected cells. When the WTRU 200 has stored the cell information, the WTRU 200 may use or leverage it for cell selection. When there is no stored information, or when cell search based on the stored information has no results, the WTRU 200 may perform initial cell selection, where the WTRU 200 has no prior knowledge of the cell parameters. For example, the WTRU 200 may not have knowledge of which RF channels are NR frequencies. As such, the WTRU 200 may scan and/or monitor one or more RF channels from a set of RF channels (e.g., based on the synchronization raster frequencies) in the NR bands to find a suitable cell. In some embodiments, a synchronization raster may indicate the frequency positions of the synchronization block (e.g., SS/PBCH block (SSB)) that can be used by the WTRU 200 for system acquisition when explicit signaling of the synchronization block position is not present. As such, the WTRU 200 may search to find the SSBs corresponding to one and more cells on each frequency channel and/or raster, where the WTRU 200 may select the strongest cell based on the measuring the RSSI, RSRP, RSRQ, SINR, and so forth for the detected SSB.

Upon finding a suitable cell, the WTRU 200 may select the suitable cell as the serving cell. The WTRU 200 may use one or more criteria to select a candidate cell as a suitable cell. The WTRU 200 may determine the criteria based on one or more evaluated parameters. The WTRU 200 may determine the evaluated parameters based on one or more of measured values or parameters in addition to one or more compensation values, scaling parameters (e.g., (pre) configured and/or indicated parameters), scaling rules, etc. and combination thereof. The evaluated parameter (e.g., evaluated RSRP, evaluated RSRQ, etc.) may be interpreted as adjusted, computed, calculated, compensated, scaled, defined, determined, identified, etc. The WTRU 200 may also calculate the addition, subtraction, multiplication, and/or division of one or more measured values with one or more compensation and/or scaling parameters to determine the corresponding evaluated parameter.

The WTRU 200 may determine the compensation values and/or scaling rules based on one or more configured and/or indicated offsets, parameters, configured values. In an example, the UE may be configured with, or determine one or more of the following parameters:

- Measured cell received power level value: For example, the WTRU 200 may measure the reference signal received power (RSRP), signal-to-noise and interference ratio (SINR), received signal strength indicator (RSSI), and so forth for one or more SS/PBCH blocks, reference signals, and/or channels.
- Measured cell quality value: For example, the WTRU 200 may measure the reference signal received quality (RSRQ) for one or more SS/PBCH blocks, reference signals, and/or channels.
- Minimum required measured RX level and/or quality level in a cell. For example, a WTRU 200 may receive, determine, or be configured with one or more parameters and/or offset values to determine the minimum required Rx level (e.g., in dBm) and/or minimum required quality level (e.g., dB) in the corresponding cell.
- Compensation values: For example, the WTRU 200 may receive, determine, or be configured with one or more parameters, offset, and/or scaling values that may be used upon receiving an indication, or based on WTRU 200 determining based on one or more modes of operation, thresholds, and so forth.
- Evaluated cell (re) selection Rx level value: For example, the WTRU 200 may compute, evaluate, and/or calculate the received level value (e.g., in dB) based on one or more measured parameters and/or compensation and/or scaling values. The WTRU 200 may also calculate the evaluated cell (re) selection Rx level value (e.g., Srxlev) based on the measured cell received level value (e.g., $Q_{rxlevmeas}$), the minimum required measured Rx level (e.g., $Q_{rxlevmin}$ and/or $Q_{rxlevminoffset}$), the compensation parameters (e.g., $P_{compensation}$), one or more temporary offset values (e.g., $Qoffset_{temp}$), and so forth (e.g., $Srxlev=Q_{rxlevmeas}-(Q_{rxlevmin}+Q_{rxlevminoffset})-P_{compensation}-Qoffset_{temp}$). As such, the WTRU 200 may select the corresponding cell as one of the candidate suitable cells if the evaluated cell (re) selection Rx level value is higher than a (pre) configured threshold (e.g., Srxlev>0 for cell selection, or Srxlev>SintraSearchP or Srxlev>SnonIntraSearchP for intra-frequency and inter-frequency, respectively, cell reselection, and so forth).
- Evaluated cell (re) selection quality value: For example, the WTRU 200 may compute, evaluate, and/or calculate the received quality value (e.g., in dB) based on one or more measured parameters and/or compensation and/or scaling values. In an example, the WTRU 200 may calculate the evaluated cell (re) selection quality value (e.g., Squal) based on the measured cell quality value (e.g., $Q_{qualmeas}$), the minimum required quality level (e.g., $Q_{qualmin}$ and/or $Q_{qualminoffset}$), one or more temporary offset values (e.g., $Qoffset_{temp}$), and so forth (e.g., $Squal=Q_{qualmeas}-(Q_{qualmin}+Q_{qualminoffset})-Qoffset_{temp}$). As such, the UE may select the corresponding cell as one of the candidate suitable cells if the evaluated cell (re) selection quality value is higher than a (pre) configured threshold (e.g., Squal>0, or Squal>SintraSearchQ, or Squal>SnonIntraSearchQ for intra-frequency and inter-frequency, respectively, cell reselection, and so forth).

The WTRU 200 may receive or be configured with one or more of the compensations and/or scaling parameters, values, settings, and/or rules as the criteria for cell (re) selection via implicit and/or explicit indications. The explicit indications may be via master information block (MIB) in corresponding SS/PBCH block, system information blocks (SIB1, SIB2, SIB3, SIB4, and so forth), semi-static configuration (e.g., via RRC), dynamic indication (e.g., via MAC-CE and/or DCI), and so forth. The WTRU 200 may determine to use one or more compensation and/or scaling rules based on implicit indication, that is based on comparing one or more parameters with corresponding thresholds for instance.

Upon measuring and calculating the evaluated received power and/or evaluated quality value, the WTRU 200 may determine perform a cell ranking for all the cells (e.g., serving and neighbor cells) that the WTRU 200 determines as the candidate suitable cells based on the cell selection criterion. The WTRU 200 may determine the cell ranking based on the calculating the R values using average RSRP results. The following parameters are non-limiting examples of the parameters that may be included in cell ranking calculation and measurement.

$$R_s = Q_{meas,s} + Q_{hyst} - \text{Qoffset}_{temp}$$

$$R_n = Q_{meas,n} - \text{Qoffset} - \text{Qoffset}_{temp}$$

where, Rs and Rn correspond to the serving and neighbor cells, respectively. In the above equation, Qhyst may represent the mobility aspects of the WTRU 200. Qoffset may be configured with different values for intra-frequency and inter-frequency cell (re) selections, and Qmeas may be the measured RSRP quantity used in cell (re) selection. The WTRU 200 may reselect a new candidate cell if the new cell has higher R value than the serving cell during a (pre) configured time interval.

For determining a neighboring cell measurement relaxation based on LR measurements, the WTRU 200 may be configured with one or more thresholds (e.g., first threshold/second threshold/third threshold) for offloading, entry condition for LP-WUS monitoring, and/or RRM relaxation for serving/neighboring cell measurements. The offloading condition may indicate that serving cell measurement via the LP-WUR 204 or second radio (e.g., switching from the first radio (MR) to the second radio (LP-WUR)). The network or a base station may transmit a message (e.g., configuration including the one or more thresholds) to the WTRU 200 via a SIB and/or RRC dedicated message. The first threshold may be associated with an offloading condition (e.g., serving cell measurement by second radio (e.g., LP-WUS) or first radio (e.g., MR) and/or a threshold of the LP-WUS monitoring entry condition (e.g., monitoring LP wake-up signal with second radio). The second (and/or third) threshold may indicate a threshold of the RRM relaxation (e.g., low mobility condition and/or not cell edge condition and/or another condition). The relaxation is associated with relaxed neighboring cell (and/or serving cell) measurement.

The network or base station may transmit the configuration and/or message via a broadcast and/or via a unicast message (e.g., RRC reconfiguration message). The configuration may include a first threshold and/or second threshold and/or third threshold (e.g., second threshold plus offset value). Each of the configuration thresholds is associated with the MR 202 (e.g., the first radio) and/or LP-WUR 204 (e.g., second radio). Each of the thresholds is associated with a first DL signal and/or a second DL signal. The WTRU 200 may measure the first DL signal via the MR (e.g., first radio) or the LP-WUR 204 (e.g., second radio) and the WTRU 200 may measure the second DL signal via the LP-WUR 204 (e.g., second radio).

One of the thresholds may be applied to both the MR 202 (e.g., first radio) and the LP-WUR 204 (e.g., second radio). For example, the WTRU 200 may be configured with the one threshold for the MR 202 (e.g., first radio) and the LP-WUR 204 (e.g., second radio) with (pre-) configured offset/compensate value(s). The measurement results of the LP-WUR 204 (e.g., second radio) may be applied with the (pre-) configured offset/compensate value(s). The (pre-) configured offset value (e.g., dBm and/or dB) of RSRP/RSRQ/SINR may be applied to the measurement results with the LP-WUR 204 (e.g., second radio). If the network or base station does not provide the threshold for the LP-WUR 204 (e.g., second radio), the WTRU 200 may configure a threshold for the MR 202 (e.g., first radio) and applied the (pre-) configured offset value to the received threshold for the MR 202 (e.g., first radio).

The base station or network may indicate whether to apply the offset/compensate value(s) to the measurement results of the LP-WUR 204 (e.g., second radio). If the network indicates to apply the offset/compensate value for the measurement results of the LP-WUR 204 (e.g., a OFDM-based and/or OOK-based LP-WUR), then WTRU 200 may apply the offset/compensate value(s). Otherwise, the WTRU 200 may not apply the offset/compensate value (s) to the measurement results of the LP-WUR (e.g., second radio)

The WTRU 200 may also be configured with one or more measurement configurations including periodicities (e.g., msec) associated with the serving cell measurement results via the LP-WUR 204 (e.g., second radio) and a priority threshold of neighboring cell(s). Each configuration may be associated with the priority of the neighboring cell(s) and the periodicity of relaxed measurement (e.g., msec). Each of the relaxed configurations may be applied when the threshold (e.g., relaxation threshold) is satisfied. A high quality of the serving cell measurement may be associated with more relaxed measurement (e.g., relaxed measurement cycle). A low quality of the serving cell measurement may be associated with less relaxed measurement (e.g., relaxed measurement cycle).

The priority of a neighboring cell may indicate an absolute priority of the concerned carrier frequency (e.g., inter-frequency for the serving cell and/or neighboring cell, and the inter-RAT frequency for the serving cell and/or neighboring cell). The priority value may be set to 1 to 8 with the lowest number (e.g., 1) being associated with the lowest priority and the highest number (e.g., 8) being associated with the highest priority. A list of priority values may be configured with a list of frequencies (e.g., inter-frequency or inter-RAT frequency). The list of priority values and frequencies may be configured with SIB message (e.g., SIB 2/4/5). Each frequency may be associated with one priority value. Based on the priority value, each frequency may be determined at least one priority level. When the priority value associated with frequency is low, the frequency of the priority may be low. When the priority value associated with frequency is high, the frequency of the priority may be high. The one or more configurations may include a threshold for a priority value. In some embodiment, when the threshold priority value is set to 3, then the priority value (e.g., 1 to 2) may be low priority. Otherwise, the priority value (e.g., 4 to 8) is a high priority value. Based on the threshold priority, the WTRU 200 may determine wherein each frequency may be high priority or low priority.

An offset and/or scaling factor (e.g., delta quality/compensate value) for a threshold (e.g., RRM relaxation for serving/neighboring cell measurements) may be configured using the LP-WUR 204 (e.g., second radio). A threshold of time gap (e.g., in the unit of symbols, slots, subframes) and/or frequency gap (e.g., PRB) between the first DL signal and the second DL may be configured to the WTRU 200. When the gap of the first DL signal and the second DL signal is above the configured threshold, the frequency and/or time characteristic/quality of signal/measurement results of the first DL signal and second DL signal may be different.

The WTRU 200 may add a delta quality (e.g., dBm/dB) with the second threshold and set the third threshold (e.g., another threshold) and/or the WTRU may apply the scaling factor to the second threshold. The WTRU may consider or use the third threshold (instead of second threshold) while using the LP-WUR 204 (e.g., second radio). When the received first DL signal and received second DL signal is below the configured threshold, the frequency and/or time characteristic/quality of signal/measurement results of the first DL signal and second DL signal may be similar (or not different). The WTRU 200 may consider the second threshold while using the the LP-WUR 204 (e.g., second radio).

An offset (e.g., delta quality) and/or scaling factor for a threshold may be configured while using the LP-WUR 204 (e.g., second radio). The type of the LP-WUR 204 (e.g., second radio) may be a OOK-based receiver. The WTRU 200 may add a delta quality (e.g., dBm/dB) with the second threshold and/or the WTRU 200 may apply the scaling factor to the second threshold. In some embodiments, the WTRU 200 may consider or set the third threshold. The WTRU 200 may measure the second DL signal based on the OOK-based receiver. Otherwise, the WTRU 200 may measure the first DL signal (or second DL signal) based on the OFDM-based receiver. The results of the measurement may be different between the first DL signal and the second DL signal when the WTRU measures the first DL signal or the second DL signal. (e.g., bandwidth/coverage of the second DL signal may be narrower/shorter than the first DL signal). The quality of the measurement results from the second DL signal may be lower than the quality of the measurement results from the first DL signal. IN some embodiments, the WTRU 200 may add a delta quality (e.g., dBm/dB) with the second threshold and/or the WTRU 200 may apply the scaling factor to the second threshold. The WTRU may also set or consider the third threshold. For example, the WTRU 200 may consider a third threshold (instead of second threshold) while using the second radio (e.g., OOK-based).

The relaxed RRM measurement is considered when a condition (e.g., cell re-selection procedure) is satisfied to the quality of the serving cell measurement. For example, when the serving cell fulfils $Srxlev<S_{IntraSearchP}$ (e.g., $S_{rxlev}$ threshold (in dB) for intra-frequency measurements) and $Squal<S_{IntraSearchQ}$, (e.g., Squal threshold (in dB) for intra-frequency measurements), then the UE may perform intra frequency measurements. When the serving cell fulfils $Srxlev<S_{nonIntraSearchP}$ (e.g., $S_{rxlev}$ threshold (in dB) for NR inter-frequency and inter-RAT measurements) and $Squal<S_{non\ IntraSearchQ}$ (e.g., Squal threshold (in dB) for NR inter-frequency and inter-RAT measurements), then UE may perform inter-frequency measurements. The WTRU 200 may determine the relaxed RRM measurement configuration when the relaxed measurement criterion (e.g., second (or third) threshold) with the LP-WUR 204 (e.g., second radio) is satisfied. The second (or third) threshold may indicate low mobility and/or not-at-cell edge condition.

The WTRU 200 may be configured with one or more (e.g., relaxed) measurement configurations including periodicities (e.g., msec) associated with the serving cell measurement results via the LP-WUR 204 (e.g., second radio) and a priority threshold of neighboring cell(s). Each measurement configuration may be associated with the priority of the neighboring cell(s) and periodicity of relaxed measurement, such as, for example, parameters (e.g., $T_{measure,\ NR\_Intra}$, $T_{measure,NR\_Inter}$, $T_{measure,NR\_Inter\_Relax}$, $T_{measure,\ NR\_Inter\_Relax}$). The periodicity of relaxed measurement may be associated with priority of neighboring cell(s). When the priority value(s) of the neighboring cell(s) is/are high, the periodicity of relaxed measurement may be longer ($T_{measure,NR\_Inter\_Relax}$ of DRX cycle is long, e.g., 1.28, 2.56). When the priority value(s) priority value of the neighboring cell(s) is/are low, the periodicity of relaxed measurement may be shorter ($T_{measure,\ NR\_Inter\_Relax}$ of DRX cycle is short e.g., 0.32, 0.64). Each configuration may be associated with measurement configuration via the MR 202 (e.g., first radio). For example, when the priority value is 1 (e.g., low priority), then the relaxed priority may be associated with long (e.g., DRX cycle is 2.56).

The WTRU 200 may determine a neighboring cell measurement configuration based on the priority of the neighboring cell. For example, when at least one neighboring cell is associated with low priority among the neighboring cells, the WTRU 200 may determine a first measurement configuration (e.g., periodicity of relaxed measurement configuration may be long) based on a list of measurement configurations. The WTRU 200 may determine the relaxed measurement based on the determined measurement configuration. When at least one neighboring cell is associated with high priority among the neighboring cells, the WTRU 200 may determine a second measurement configuration (e.g., periodicity of relaxed measurement configuration may be shorter than the first measurement configuration) based on a list of measurement configurations. The WTRU 200 may perform the relaxed measurement based on the determined measurement configuration.

The WTRU 200 may determine whether not to determine or perform the neighboring cell measurement based on the serving cell measurement results. For example, when the serving cell measurement results, via the LP-WUR (e.g., second radio), is above the threshold, the WTRU 200 may determine not to perform the neighboring cell measurement. The threshold may indicate that the WTRU 200 may not perform the neighboring cell measurement. The network or base station may configure the threshold. In some embodiments, the WTRU 200 may determine to initiate performing the neighboring cell measurement when the serving cell measurement results via second radio is below the threshold.

The WTRU 200 may determine the serving measurement configuration (e.g., relaxed). For example, when a threshold (e.g., allowed to serving cell measurement relaxation) of the measurement results of the the LP-WUR (e.g., second radio) is satisfied, the WTRU 200 may determine the serving measurement configuration (e.g., relaxed). The WTRU 200 may (or may not) to perform the relaxed serving cell measurement based on the determined measurement configuration.

Figure 4:
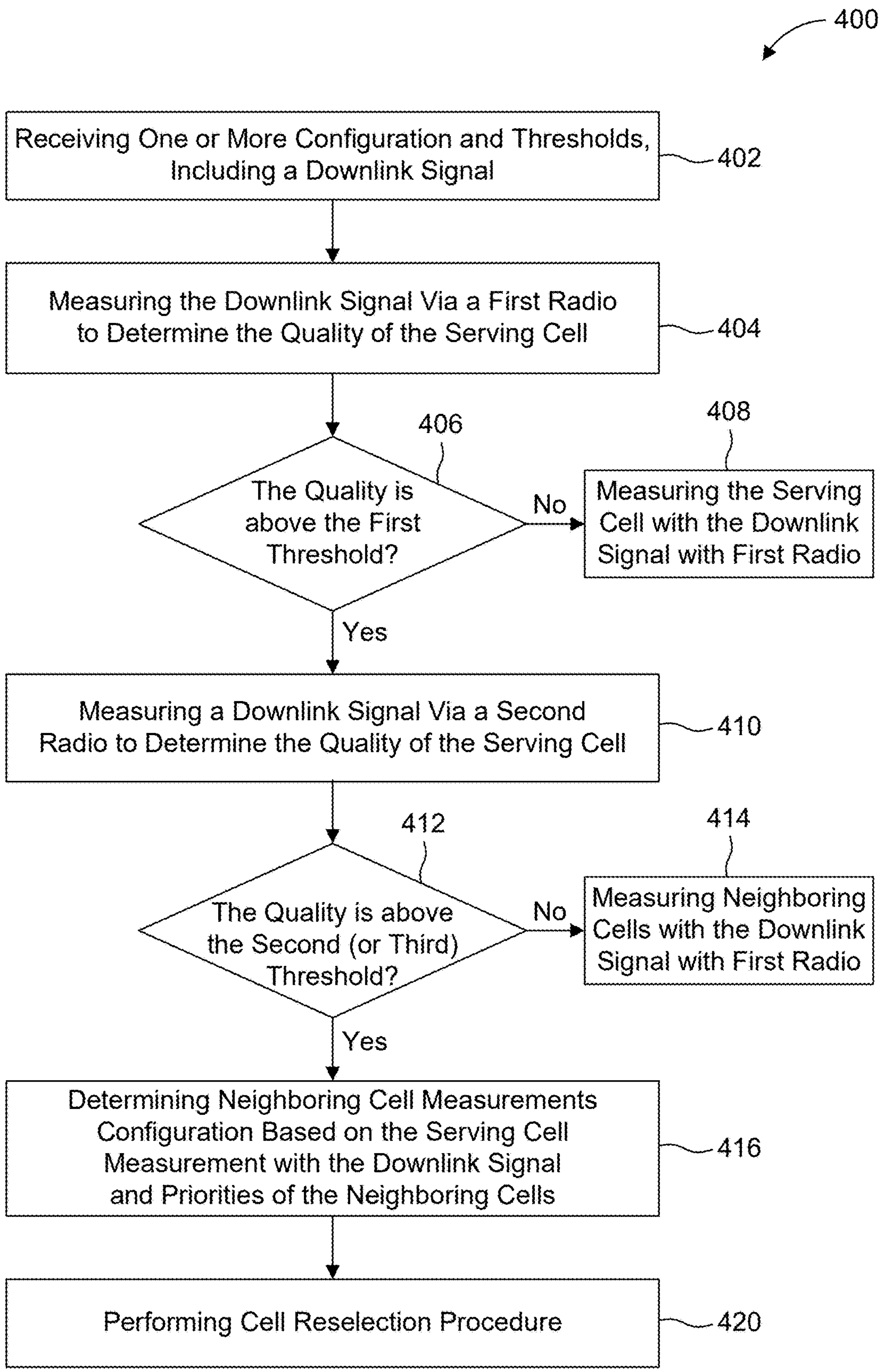
FIG. 4 illustrates a flow diagram of a method, according to an exemplary embodiment.

Referring now to FIG. 4, a flow diagram of a process 400 is illustrated for serving cell measurement relaxation based on LR measurements. The process 400 enables a determination of relaxation of neighboring cell measurements with a first a main radio (MR) (e.g., a second radio or MR 202 of FIG. 2) when the measurement results of serving cell with the first radio (e.g., MR) is not available. A WTRU (e.g., WTRU 200 of FIG. 2) may determine the relaxation of the neighboring cell measurement based on the quality of serving cell and priority frequency. For example, after serving cell measured by a LP-WUR (e.g., second radio or LP-WUR 204 of FIG. 2) of UE, the UE may determine relaxed periodicity of neighboring cell measurement via the MR based on the quality of the LR measurement and priority of the neighboring cell.

At block 402, the WTRU receives one or more configuration and thresholds. The WTRU may be configured with a first radio (e.g., main radio (MR)) and a second radio (e.g., a low power wake-up radio (LP-WUR)). The WTRU monitors a first DL signal (e.g., NR-SS) with the MR (e.g., first radio) or the L (e.g., a OFDM-based second radio) and monitors the second DL signal (e.g., LP-SS) with the LP-WUR (e.g., OOK-based/OFDM-based). The WTRU may receive a first message related to the quality of serving cell measurement. The first message may include a first threshold and a second threshold. The first threshold may indicate a serving cell quality based on a measurement of the first DL signal via first radio (e.g., offloading condition and/or entry of LP-WUS monitoring). The second threshold may indicate a serving cell quality based on a measurement of the first or second DL signal via the LP-WUR or second radio (e.g., relaxation condition for neighboring cell measurement). The WTRU may receive a second message for the relaxation configurations of neighboring cell measurements based on the first DL signal. The relaxation configuration of neighboring cell measurement may include one or more measurement configurations including periodicities (e.g., msec) associated with one or more serving cell measurement results via the LP-WUS or second radio and a priority threshold of neighboring cells.

At block 404, the WTRU measures the quality of the serving cell with the first DL signal via first radio. At block 406, the WTRU may determine whether a serving measurement result, such as, for example, the quality of the serving cell (e.g., Srxlev or Squal) is above the first threshold. When the quality of the servicing cell (e.g., Srxlev, Squal) is at or below the first threshold (e.g., via the MR or first radio), the UE determines a serving cell measurement by measuring the serving cell with first DL signal via first radio at block 408. When the quality of the severing cell (e.g., Srxlev, Squal) is above the first threshold at block 406, the WTRU may performs a serving cell measurement with second DL signal via the LP-WUR or second radio and may measure the quality of the serving cell with the second DL signal via LP-WUR or second radio (i.e., switching from the first radio to the second radio) at block 410.

At block 410, the WTRU measures the quality of the serving cell with the first DL signa via second radio. At block 412, the WTRU may determine whether the quality of serving cell (e.g., Srxlev, Squal) is above the second (or third) threshold. When the quality of serving cell (e.g., Srxlev, Squal) is at or below the first threshold (e.g., via the MR or first radio), the WTRU may perform a serving cell measurement by measuring the neighboring cells with first DL signal via first radio at block 414.

When the quality of serving cell (e.g., Srxlev, Squal) signal is above the second (or third) threshold (e.g., via the second radio) at block 412, the WTRU may determine cell measurement configurations with the second DL signal via the LP-WUR or second radio (i.e., switching from the first radio to the second radio) at block 416. For example, the WTRU may determine a measurement configuration for neighboring cell measurements based on one or more of the serving cell measurements with the second (or third) threshold and priority of a neighboring cell. IF the serving cell measurement result is greater than the second (or third) threshold, the WTRU determines a measurement configuration based on the priority of a neighboring cell. If priority of the neighboring cell(s) is high priority (e.g., greater than the priority threshold), then the WTRU determines a first measurement configuration (e.g., less relaxed periodicity) via the first radio. If priority of the neighboring cell(s) is low priority (e.g., lower than the priority threshold), then the WTRU determines a second measurement configuration (e.g., more relaxed periodicity) via the first radio. Otherwise, the serving measurement result is below the second threshold.

The WTRU may determine the third measurement configuration (e.g., normal periodicity without relaxation) for the neighboring cell measurement via the MR or first radio. The WTRU may determine a third threshold based on the second threshold, time/frequency resources of the first DL signal and the second DL signal, and a type of the second radio. For example, if the time/frequency gap (e.g., PRB) between first DL signal and second DL signal is above a threshold, the third threshold is equal to the second threshold plus a first delta quality. If the type of the second radio is an OOK based receiver, the third threshold is equal to the second threshold plus a second delta quality. Otherwise, the third threshold is equal to the second threshold.

The WTRU may determine or perform measurements based on the determined measurement configuration. Based on the measurements results for each of the neighboring cells, the WTRU may perform a cell reselection procedure at block 420 (if re-selection criteria are satisfied). For example, the WTRU may reselect to the determined cell and may transmit to the determined cell (e.g., PRACH). Otherwise, the WTRU may remain on the current serving cell.

Referring again to the FIG. 2, the WTRU 200 may determine neighboring cell measurements based on LP-WUR type. The WTRU 200 may receive, determine, be configured, and/or indicated with one or more configuration information on RRM measurements. For example, the WTRU 200 may receive the configuration information from a Node B. The WTRU m200 ay receive the configuration information via MIB, SIB, RRC, MAC-CE, DCI, etc. The WTRU 200 may use the received, determined, configured, and/or indicated configuration information for RRM measurement for the serving cell and/or one or more of the non-serving cells (e.g., neighbor cells).

The WTRU 200 may be configured to use, receive, and/or transmit based on the main radio (MR) 202 (e.g. the first radio). The WTRU 200 may be configured to use, receive, and/or transmit based on the Low-power Radio 204 (LP-WUR) (e.g., the second radio). The WTRU 200 may use the MR 202 or the LP-WUR 204 to receive a first DL signal. The LP-WUR 204 may be a OOK-based or OFDM-based receiver. For example, the WTRU 200 may determine, receive, be configured, and/or indicated to monitor and/or receive the first DL signal based on the configured and/or indicated ML (e.g., first radio) or the configured and/or indicated LP-WUR 204 (e.g., the second radio). In some embodiments, the WTRU 200 may be configured and/or indicated to monitor and/or receive the first DL signal based on the second radio, where the receiver at the WTRU may be for example an OFDM-based receiver. The first DL signal may be based on one or more reference signals (RS), for example, SSB, CSI-RS, TRS, NR-SS, etc.

The WTRU 200 may determine, receive, be configured, and/or indicated to monitor and/or receive a second DL signal based on the configured and/or indicated LP-WUR 204 (e.g., the second radio). The configured and/or indicated second DL signal may be a reference signal, for example, LP-SS.

The WTRU 200 may receive, determine, be configured, and/or indicated with one or more threshold values, for example regarding RRM measurements. The WTRU 200 may receive the threshold values from a Node B. The WTRU 200 may receive the threshold values via MIB, SIB, RRC, MAC-CE, DCI, etc. The WTRU 200 may use the configured and/or indicated threshold values for RRM measurements in the serving cell. The WTRU 200 may use the configured and/or indicated threshold values for one or more RRM measurement values, where the WTRU 200 may measure the RRM measurement values based on one or more reference signals, channels, etc. The threshold values may be for the measured RRSP, RSSI, SINR, SNR, and so forth.

In some embodiments, the WTRU 200 may be configured and/or indicated with a first threshold value. The WTRU 200 may use the first threshold for one or more of the RRM measurements based on the first DL signal, where the first DL signal may be received via the MR 202 (e.g., the first radio). The WTRU 200 may use the first threshold as the condition for offloading RRM measurements from the first DL signal to the second DL signal. The WTRU 200 may also use the first threshold as the condition for offloading RRM measurements based on the first DL signal to RRM measurements based on the second DL signal.

The WTRU 200 may be configured and/or indicated with a second threshold value. The WTRU 200 may use the second threshold for one or more of the RRM measurements based on the first or second DL signals, where the first or the second DL signals may be received via the second radio. The WTRU 200 may also use the second threshold as the condition for relaxing RRM measurements based on one or more of the non-serving cells.

The MR 202 (e.g., first radio) of the WTRU 200 may determine to switch to perform RRM measurements based on a configured and/or indicated LR (e.g., a second radio) The WTRU 200 may perform RRM measurements on MR (e.g., first radio) based on configured and/or indicated first DL signal. The WTRU 200 may determine to switch RRM measurements based on the MR (e.g., first radio) to RRM measurements based on the LP-WUR 204 based on one or more conditions.

The WTRU 200 may compute, evaluate, and/or calculate the received quality value (e.g., in dB) based on one or more RRM measurements and/or scaling values. The WTRU 200 may calculate the evaluated cell (re) selection quality value (e.g., Squal) based on the measured cell quality value (e.g., Qqualmeas), the minimum required quality level (e.g., Qqualmin and/or Qqualminoffset), one or more temporary offset values (e.g., Qoffsettemp), and so forth (e.g., SqualQqualmeas−(Qqualmin+Qqualminoffset)−Qoffsettemp). As such, the WTRU 200 may select the corresponding cell as one of the candidate suitable cells when the evaluated cell (re) selection quality value is higher than a (pre) configured threshold (e.g., Squal>0, or Squal>SintraSearchQ, or Squal SnonIntraSearchQ for intra-frequency and inter-frequency, respectively, cell reselection, and so forth).

The WTRU 200 may compute, evaluate, and/or calculate the received (Rx) (e.g., power) level value (e.g., in dB) based on one or more measured parameters, compensation values, and/or scaling values. The WTRU 200 may calculate the evaluated cell (re) selection Rx level value (e.g., Srxlev) based on the measured cell received (e.g., power) level value (e.g., Qrxlevmeas), the minimum required measured Rx (e.g., power) level (e.g., Qrxlevmin and/or Qrxlevminoffset), the compensation parameters (e.g., Pcompensation), one or more temporary offset values (e.g., Qoffsettemp), and so forth (e.g., Srxlev=Qrxlevmeas−(Qrxlevmin+Qrxlevminoffset)−Pcompensation−Qoffsettemp). As such, the WTRU 200 may select the corresponding cell as one of the candidate suitable cells when the evaluated cell (re) selection Rx level value is higher than a (pre) configured threshold (e.g., Srxlev>0 for cell selection, or Srxlev>SintraSearchP or Srxlev>SnonIntraSearchP for intra-frequency and inter-frequency, respectively, cell reselection, and so forth).

When one or more of the RRM measurements and/or calculated parameters based on the serving cell are higher than a first threshold, the WTRU 200 may determine to switch RRM measurements based on the first radio to RRM measurements based on the second radio. The WTRU 200 may perform one or more of the RRM measurements based the first radio. In some embodiments, the WTRU 200 may be configured and/or indicated with the first DL signal, second DL signals, and/or one or more of the thresholds via one or more MIB, SIB, RRC, MAC-CE, and/or DCI signaling. The WTRU 200 may perform RRM measurements on the MR 202 (e.g., the first radio) based on configured and/or indicated first DL signal. The RRM measurements may include one or more of RSRP, RSSI, SINR, etc. The calculated parameters may include one or more of Srxlev, Squal, etc. When the WTRU 200 determines to switch, the WTRU 200 may perform the RRM measurements based on the second radio, via the configured and/or indicated first and/or second DL signals. When one or more of the RRM measurements and/or calculated parameters based on the serving cell are lower than the determined, configured, and/or indicated first threshold, the WTRU may perform the RRM measurements based on the MR 202 (e.g., the first radio), via the configured and/or indicated first DL signal.

The WTRU may determine a third threshold value based on a second configured and/or indicated threshold value in addition to one or more conditions and parameters. The WTRU may be configured and/or indicated with a second threshold value, based on which the WTRU may determine the conditions for relaxing RRM measurements based on one or more of the non-serving cells. The WTRU may determine the third threshold value based on the second threshold, time/frequency resources of the first DL signal and the second DL signal, type of the second radio, and so forth. In some embodiments, the WTRU may determine a third threshold value based on a determined, configured, and/or indicated second threshold value and one or more determined, configured, and/or indicated delta values.

When the time gap (e.g., in the unit of symbols, slots, etc.) and/or frequency gap (e.g., PRB) between the configured and/or indicated first DL signal and second DL signal is higher than a corresponding threshold, the WTRU may calculate and/or determine the third threshold to be equal to the second threshold plus a determined, configured, and/or indicated first delta quality. When the time gap and/or frequency gap between the configured and/or indicated first DL signal and second DL signal is lower than the corresponding threshold, the WTRU may set or consider the third threshold to be equal to the second threshold. The WTRU may receive configuration information and/or indications on one or more corresponding threshold values and/or one or more first delta offset values via MIB, SIB, RRC, MAC-CE, DCI, etc.

When the type of the receiver used for the second radio is of a determined, configured, and/or indicated type (e.g., OOK based receiver), the WTRU may calculate and/or determine the third threshold to be equal to the second threshold plus a determined, configured, and/or indicated second delta quality. When the type of the receiver used for the second radio is not of a determined, configured, and/or indicated type (e.g., OOK based receiver), the WTRU may consider or set the third threshold to be equal to the second threshold. The WTRU may receive configuration information and/or indications on one or more threshold values and/or one or more second delta offset values via MIB, SIB, RRC, MAC-CE, DCI, etc.

For determining a neighboring cell measurement configuration, the WTRU 200 may determine, be configured and/or indicated to perform one or more RRM measurements (e.g., neighboring cell measurements) via the LP-WUR 204 (e.g., the second radio) when the WTRU 200 experiences/is configured with suitable conditions/configurations. The use of the LP-WUR 204 (e.g., the second radio) may result in lower UE power consumption compared to using the MR 202 (e.g., first radio) for measurements. To determine whether to use the MR 202 (e.g., first radio) or LP-WUR 204 (e.g., the second radio) for RRM measurements (e.g., neighboring cell measurements), the WTRU may perform one or more processes as described below.

The WTRU 200 may determine a radio (e.g., MR 202 or LP-WUR 204) for neighboring cell measurements based on one or more serving cell measurement results (e.g., Srxlev, Squal, Qrxlevmeas, Qqualmeas) and thresholds (e.g., second thresholds, such as a second threshold on Srxlev, a second threshold on Squal, a second threshold on Qrxlevmeas, a second threshold on Qqualmeas) or third thresholds (e.g., a third threshold on Srxlev, a third threshold on Squal, a third threshold on Qrxlevmeas, a third threshold on Qqualmeas)).

The WTRU 200 may determine the thresholds for radio selection (second thresholds or third thresholds) based on type (e.g., OFDM-based or OOK-based receiver) of receiver of the LP-WUR 204 (e.g., the second radio). When the LP-WUR 204 (e.g., the second radio) is an OFDM-based receiver, the WTRU 200 may determine a receiver or radio for neighboring cell measurements based on one or more serving cell measurement results (e.g., Srxlev, Squal, Qrxlevmeas, Qqualmeas) and associated second thresholds (e.g., a second threshold on Srxlev, a second threshold on Squal, a second threshold on Qrxlevmeas, second threshold on Qqualmeas).

When one or more of serving cell measurement results (e.g., Srxlev, Squal, Qrxlevmeas, Qqualmeas)≥second configured and/or indicated thresholds, the WTRU 200 may determine to use the LP-WUR 204 (e.g., the second radio) for neighboring cell measurements. The WTRU 200 may perform neighboring cell measurements by monitoring and receiving 2nd DL signal (LP-SS) via the LP-WUR 204 (e.g., the second radio). In some embodiments, if Srxlev>second threshold on Srxlev and Squal>second threshold on Squal, the WTRU 200 may determine to use the LP-WUR 204 (e.g., the second radio) for neighboring cell measurements. When one or more of serving cell measurement results (e.g., Srxlev, Squal, Qrxlevmeas, Qqualmeas)<second configured and/or indicated thresholds, the WTRU 200 may perform neighboring cell measurements by monitoring and receiving first DL signal (e.g., NR-SS) or a part of first DL signal (e.g., PSS) via the LP-WUR 204 (e.g., the second radio)). In some embodiments, if Srxlev second threshold on Srxlev and/or Squal<second threshold on Squal, the UE may perform neighboring cell measurements by monitoring and receiving first DL signal (e.g., NR-SS) or a part of first DL signal (e.g., PSS) via LP-WUR 204 (e.g., the second radio).

When the LP-WUR 204 (e.g., the second radio) is an OOK-based receiver, the WTRU 200 may determine a radio or receiver for neighboring cell measurements based on one or more serving cell measurement results (e.g., Srxlev, Squal, Qrxlevmeas, Qqualmeas) and associated third thresholds (third threshold on Srxlev, third threshold on Squal, third threshold on Qrxlevmeas, third threshold on Qqualmeas). For example, when one or more of serving cell measurement results (e.g., Srxlev, Squal, Qrxlevmeas, Qqualmeas)≥third configured and/or indicated thresholds, the WTRU 200 may determine to use the LP-WUR 204 (e.g., the second radio) for neighboring cell measurements. The WTRU 200 may perform neighboring cell measurements by monitoring and receiving second DL signal (LP-SS) via the LP-WUR 204 (e.g., the second radio). In some embodiments, if Srxlev≥third threshold on Srxlev and Squal≥third threshold on Squal, the WTRU 200 may determine to use second radio for neighboring cell measurements.

When one or more of serving cell measurement results (e.g., Srxlev, Squal, Qrxlevmeas, Qqualmeas)<third configured and/or indicated thresholds, the WTRU 200 may determine to perform neighboring cell measurements via the MR 202 (e.g., the first radio). The WTRU 200 may perform neighboring cell measurements by receiving first DL signal (e.g., NR-SS) via the MR (e.g., the first radio). For example, if Srxlev<third threshold on Srxlev and/or Squal<third threshold on Squal, WTRU 200 may determine to perform neighboring cell measurements via the MR (e.g., the first radio).

The WTRU 200 may be (pre) configured by the network to perform measurements related to cell (re) selection procedures. These measurements may be (pre) configured to be periodic, triggered by the network, or UE-event based, such as timer expiry and/or changing their RRC state or configuration. For example, the WTRU 200 may be configured with both a MR and LP-WUR may be (pre) configured to perform measurements for cell (re) selection on specific RSs, such as NR-SS and LR-SS. When the WTRU 200 may determine to use the main radio (MR) or LP-WUR 204 with OFDM, the WTRU may use the NR-SS (pre) configuration to perform the measurements, including the resource configuration (time, frequency positions). Alternatively, when the WTRU 200 determines to use the LP-WUR with OOK (or LP-WUR with OFDM), the WTRU 200 may use the LR-SS (pre) configuration to perform the measurements, including time/frequency resource positions.

When a WTRU 200 performs the neighboring cell measurement via LP-WUR 204 (e.g., the second radio) the WTRU 200 may receive SIBs from the neighboring cells via the LP-WUR 204 (e.g., the second radio). The WTRU 200 may perform LP-WUS monitoring (e.g., monitoring/receiving LP-WUS) and/or perform serving cell measurement and/or perform neighboring cell measurement via the LP-WUR 204 (e.g., the second radio). The WTRU 200 may compute, evaluate, and/or calculate the received level value (e.g., dB/dBm) based on the measurement results via the LP-WUR 204 (e.g., the second radio) based on a DL signal (e.g., the first DL signal and/or the second DL signal). The WTRU 200 may be (pre) configured by the network or base station with multiple frequencies to monitor for cell (re) selection, which may be further be configured with frequency priorities.

During the cell reselection evaluation process, the WTRU 200 may determine the frequencies to perform measurements on. When the serving cell's frequency is not the highest priority frequency, the WTRU 200 may perform measurement on frequencies that are of higher priorities than the serving cell's frequency, if any. When the measurement on the serving cell is below a threshold for a given for both RSRP and RSRQ (Srxlev<SintraSearchP and Squal<SIntraSearchQ), the WTRU 200 may perform intra-frequency measurements for re-selection. In some embodiments, the WTRU 200 may perform intra-frequency measurement when the conditions are not satisfied.

The WTRU 200 may be configured with multiple sets of thresholds SintraSearchP and SintraSearchQ, associated with the different configured radios. For example, when the measurements are performed using the MR 202, the WTRU 200 uses a first set of threshold values. When the WTRU 200 performs measurement with a OFDM-based LP-WUR 204 (e.g., the second radio), the WTRU 200 may use a second set of thresholds, associated with the LP-WUR 204 (e.g., the second radio). When the WTRU 200 uses a OOK-based LP-WUR 204 (e.g., the second radio), the WTRU 200 may use a third set of thresholds, associated with the OOK-based LP-WUR 204 (e.g., the second radio). Alternatively, the WTRU 200 may be configured with offsets that can be set in addition to the SintraSearchP and SintraSearchQ values (e.g., one offset for OFDM based radios and one offset for OOK based radios).

The WTRU 200 may verify whether the conditions Srxlev>SintraSearchP+OffsetLR_P and Squal>SIntraSearchQ+OffsetLR_Q are satisfied. For example, when the measurement on the serving cell is below a threshold for a given for both RSRP and RSRQ (Srxlev<SnonIntraSearchP and Squal<SnonIntraSearchQ), the WTRU 200 may perform inter-frequency measurements for reselection with frequencies of equal or lower priorities. In some embodiments, the WTRU 200 may perform with inter-frequency measurements on frequencies of equal or lower priorities measurement when the conditions are not satisfied.

The WTRU 200 may be configured with multiple sets of thresholds SnonIntraSearchP and SnonIntraSearchQ, associated with the different configured radios. For example, when the measurements are performed using the MR 202, the WTRU 200 may use a first set of threshold values. When the WTRU 200 performs measurement with a OFDM-based LP-WUR 204 (e.g., the second radio), the WTRU 200 may use a second set of thresholds, associated with the OFDM-based LP-WUR 204 (e.g., the second radio). When the WTRU 200 uses a OOK-based LP-WUR 204 (e.g., the second radio), the WTRU 200 may use a third set of thresholds, associated with the OOK-based LP-WUR 204 (e.g., the second radio). Alternatively, the WTRU 200 may be configured with offsets that can be set in addition to the SnonIntraSearchP and SnonIntraSearchQ values (e.g., one offset for OFDM based radio and one offset for OOK based radios).

The WTRU 200 may verify whether the conditions Srxlev>SnonIntraSearchP+OffsetLR_P and Squal>SnonIntraSearchQ+OffsetLR_Q are satisfied. The WTRU 200 may also apply the measurement relaxation criterions to avoid performing measurements such as checking whether the distance to the serving cell and the WTRU 200 being below a configured distanceThresh. The WTRU 200 may be configured with different distanceThresh thresholds, for the different radios. For example, the WTRU 200 may use the distanceThresh_LR when the WTRU 200 determines to use the LP-WUR 204 (e.g., the second radio) for the cell reselection measurements. The distanceThresh_LR value may be configured to be different for OFDM based on a OOK-based radio.

Once the WTRU 200 determines the frequencies to perform cell (re) selection measurements on, the WTRU 200 may determine or perform the measurements on these frequencies using the determined radio as described above. When the WTRU 200 performs measurements using the MR 202, the WTRU 200 measures and evaluate the configured quantities for MR 202 (e.g., the SS-RSRP and SS-RSRQ quantities on NR-SS) of the different cells. When the WTRU 200 use the LP-WUR 204 (e.g., the second radio), the WTRU 200 may measure and evaluate the configured quantities (e.g., LR-RSRP and LR-RSRQ) on NR-SS (for OFDM-based LP-WUR) or LR-SS (for OOK-based LP-WUR) of the different cells.

The WTRU 200 may be (pre) configured by the network or base station with parameters and thresholds to determine whether a measured cell from shall be selected for (re) selection. For example, the WTRU 200 may be (pre) configured with multiple parameters sets for the MR 202 and the LP-WUR 204. The values configured for the LP-WUR 204 (e.g., the second radio) may be different whether the WTRU 200 is using OFDM-based LP-WUR or OOK-based LP-WUR. For instance, the value may be as follows:

- Thresh_X,HighQ for MR and Thresh_X,HighQ_LR for LP-WUR,
- Thresh_X,LowQ for MR and Thresh_X,LowQ_LR for LP-WUR,
- ThreshServing LowQ for MR and ThreshServing LowQ_LR for LP-WUR,
- Thresh_X,HighP for MR and Thresh_X,HighP_LR for LP-WUR,
- Thresh_X,LowP for MR and Thresh_X,LowP_LR for LP-WUR,
- ThreshServing_LowP for MR and ThreshServing_LowP_LR for LP-WUR,
- TreselctionRAT for MR or TreselctionRAT_LR for LP-WUR.

The WTRU 200 may select the cell for reselection based on, for example, one or more of the following:

- A cell of a higher priority NR or EUTRAN RAT/frequency measured with LR that fulfils Squal>Thresh_X, HighQ_LR for a configured time interval TreselectionRAT_LR may be used for reselection.
- A cell of a higher priority NR or EUTRAN RAT/frequency measured with MR that fulfils Squal>Thresh_X,HighQ for a configured time interval TreselectionRAT may be used for reselection.
- A cell of a higher priority RAT/frequency measured with LP-WUR that fulfils Squal>Thresh_X,HighP_LR for a configured time interval TreselectionRAT_LR may be used for reselection.
- A cell of a higher priority RAT/frequency measured with MR that fulfils Squal>Thresh_X,HighP for a configured time interval TreselectionRAT may be used for reselection.
- A cell in the same frequency as the serving cell or on a frequency of equal priority as the serving cell if the measured cell as the highest ranking as described above.
- A cell of a lower priority NR or EUTRAN RAT/frequency measured with LR that fulfils Squal>Thresh_X, LowQ_LR for a configured time interval TreselectionRAT_LR may be used for reselection and if the serving cell Squal<ThreshServing, LowQ_LR.
- A cell of a lower priority NR or EUTRAN RAT/frequency measured with MR that fulfils Squal>Thresh_X,LowQ for a configured time interval TreselectionRAT may be used for reselection and if the serving cell Squal<ThreshServing, LowQ.
- A cell of a lower priority RAT/frequency measured with LP-WUR that fulfils Squal>Thresh_X,LowP_LR for a configured time interval TreselectionRAT_LR may be used for reselection and if the serving cell Squal<ThreshServing, LowQ_LR.
- A cell of a higher priority RAT/frequency measured with MR that fulfils Squal>Thresh_X,LowP for a configured time interval TreselectionRAT may be used for reselection and if the serving cell Squal<ThreshServing, LowQ.

The WTRU 200 may keep the current cell and not reselect another cell if one or more of the above criterions are not satisfied or if the serving cell is the highest ranked cell in the same frequency priority. The WTRU 200 may perform reselection on another cell based on above criterions and camp on a new cell. By camping on a new cell, the WTRU 200 may monitor for LP-WUS and/or MR-based signals and controls corresponding to that cell, such as LR-SS, LP-WUS, MR-SS, PDCCH etc.

The WTRU 200 may determine to wake up the MR after cell reselection, when the reselection was based on LP-WUR measurements. For example, when the WTRU 200 is lacking some information or configuration about the new selected cell (or has outdated system information), the WTRU 200 may wake up the MR 202 to monitor and receive MIB and/or SIB1, and/or SIB related to the LP-WUR configuration, if any. In some embodiments, the WTRU 200 may monitor SSBs to perform beam selection. In other embodiments, the WTRU 200 may transmit in PRACH for random access, e.g., to indicate its presence in the new cell and/or to indicate the selected SSB, and/or to indicate a need for UL transmissions.

Figure 5:
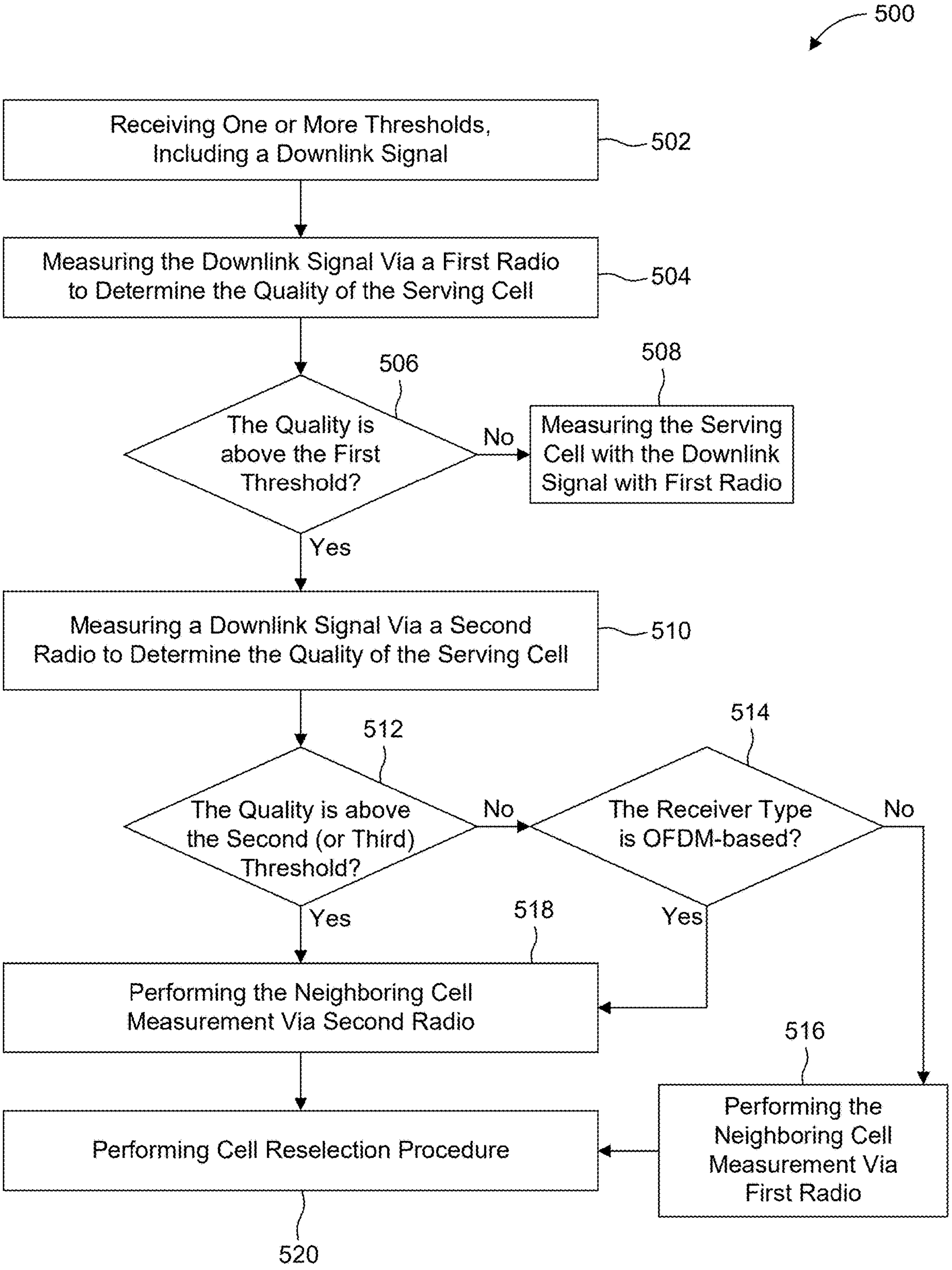
FIG. 5 illustrates a flow diagram of another method, according to another exemplary embodiment.

Referring now to FIG. 5, a flow diagram of a process 500 is shown for Neighboring cell measurement based on LP-WUR type. The process 500 enables a determination of serving cell and neighboring cell measurements (e.g., relaxed) with a LP-WUR or second radio (e.g., LP-WUR 204 of FIG. 2) when the measurement results of serving cell with the LP-WUR is satisfied. A WTRU (e.g., WTRU 200 of FIG. 2) can achieve more power saving gain while performing serving cell and neighboring cell measurement with the LP-WUR. After determining a serving cell measurement by the LP-WUR, the WTRU may determine whether to determine or perform a neighboring cell measurement (e.g., relaxed) with the LP-WUR and neighboring cell measurements based on the type of the LP-WUR.

At block 502, the WTRU receives one or more configuration and thresholds. The UE may be configured with a first radio (e.g., a main radio (MR)) and a second radio (e.g., a low power wake-up radio or receiver (LP-WUR)). The WTRU monitors a first DL signal (e.g., NR-SS) with the first radio (e.g., MR) or the second radio (i.e., OFDM-based LP-WUR) and monitors a second DL signal (e.g., LP-SS) with the second radio (e.g., OOK-based/OFDM-based LP-WUR) The WTRU receives a first message related to the quality of serving cell measurement. The first message may include a first threshold and a second threshold. The first threshold indicates a serving cell quality with first DL signal via the first radio or MR (e.g., offloading condition and/or entry of LP-WUS monitoring). The second threshold indicates a serving cell quality with first or second DL signal via second radio or LP-WUR (e.g., relaxation condition for neighboring cell measurement). The WTRU receives a second message for relaxation configurations of neighboring cell measurement with the first DL signal. The relaxation configurations of neighboring cell measurement may include one or more measurement configurations including periodicities (e.g., msec) associated with one or more serving cell measurement results via second radio and a priority threshold of neighboring cells.

At block 504, the WTRU may measure the quality of the serving cell with the first DL signa via first radio or MR. At block 506, the WTRU may determine whether the serving measurement result (e.g., Srxlev or Squal), such as, the quality of serving cell, is above the first threshold. When the serving measurement result (e.g., quality of the seven cell, such as Srxlev, Squal) is at or below the first threshold (e.g., via the first radio), the WTRU determines a serving cell measurement by measuring the serving cell with first DL signal via first radio at block 508. When the serving measurement result (e.g., the quality of the serving cell, such as Srxlev, Squal) is above the first threshold (e.g., via the first radio) at block 506, the WTRU may determine or perform a serving cell measurement (e.g., measuring the quality of the serving cell) with the (first or) second DL signal via the second radio or the LP-WUR (i.e., switching from the first radio to the second radio) at block 510.

At block 512, the WTRU determines whether a serving measurement result (e.g., the quality of serving cell) is above the second (or third) threshold. When the quality of the service cell is at or below the second (or third) threshold, the WTRU may determine whether the receiver type of the second radio or LP-WUR is OFDM-based at block 514. If the receiver type of the second radio or LP-WUR is not OFDM-based, the UE may determine or perform a neighboring cell measurement via the first radio or MR at block 516 and then proceed to block 520 to perform a cell reselection procedure as further described below. If the receiver type of the second radio or LP-WUR is OFDM-based at block 514, the WTRU may perform or determine the neighboring cell measurement via the second radio or LP-WUR at block 518.

When the serving cell measurement result (e.g., the quality of the serving cell), is above the second (or third) threshold (e.g., via the second radio) at block 512, the WTRU may perform or determine the neighboring cell measurement via the second radio or LP-WUR at block 518. In some embodiments, the WTRU may determine a third threshold based on the second threshold, time/frequency resources of the first DL signal and the second DL signal, and a type of the second radio. For example, if the type of the second radio or LP-WUR is an OOK based receiver, the third threshold is equal to the second threshold plus a second delta quality. Otherwise, the third threshold is equal to the second threshold.

The WTRU may perform measurements based on the determined measurement configuration. Based on the measurements results for each of the neighboring cells, the WTRU may perform a cell reselection procedure at block 420 (if re-selection criteria are satisfied). As such, the WTRU may reselect to the determined cell and may transmit to the determined cell (e.g., PRACH). Otherwise, the WTRU may remain on the current serving cell.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU) having a first radio and a second radio, the method comprising:

receiving a first downlink signal at the first radio;

performing a first measurement of the first downlink signal;

determining a first quality of a serving cell based on the first measurement;

receiving a second downlink signal at the second radio, wherein the second downlink signal comprises the first downlink signal or another downlink signal;

performing a second measurement of the second downlink signal based at least in part on the first quality of serving cell exceeding a first threshold value;

determining a second quality of the serving cell based on the second measurement;

determining a measurement configuration of at least one neighbor cell based at least in part on the second quality of the serving cell exceeding a second threshold value or a third threshold value; and performing cell reselection.

2. The method of claim 1, further comprising receiving a priority of the neighboring cell.

3. The method of claim 1, wherein the measurement configuration of the at least one neighbor cell is determined based on the second measurement of the serving cell and/or a priority of the neighboring cell.

4. The method of claim 1, further comprising, on a condition that a priority of the neighboring cell is greater than a priority threshold, determining a first measurement configuration of the at least one neighbor cell via the first radio, wherein the first measurement configuration has a relaxed periodicity that is longer than a normal periodicity.

5. The method of claim 4, further comprising, on a condition that a priority of the neighboring cell is less than a priority threshold, determining a second measurement configuration of the at least one neighbor cell via the first radio, wherein the second measurement configuration has a further relaxed periodicity that is substantially longer than a normal periodicity.

6. The method of claim 5, further comprising, on a condition that the measurement of the second downlink signal is less than a second threshold, determining a third measurement configuration of the at least one neighbor cell via the first radio, wherein the third measurement configuration has a normal or unrelaxed periodicity.

7. The method of claim 1, further comprising determining a third threshold value based on the second threshold value, time or frequency resources of the first downlink signal, a type of the of the second radio, or a combination thereof.

8. The method of claim 1, wherein the third threshold value equals the second threshold value plus a delta quality or offset on a condition that the second radio being an OOK-based radio or receiver.

9. The method of claim 1, wherein the third threshold value equals the second threshold value on a condition that the second radio not an OOK-based radio or receiver.

10. The method of claim 1, further comprising performing measurements of a signal of the neighboring cell based on the determined measurement configuration.

11. The method of claim 1, further comprising receiving a first message, wherein the first message includes the first threshold value and the second threshold value.

12. The method of claim 1, further comprising receiving a second message, wherein the second message includes one or more measurement configurations for at least one neighboring cell and at least one priority threshold associated with the at least one neighboring cell.

13. The method of claim 12, further comprising determining the measurement configurations for the received measurement configurations based on a quality and/or a priority of the neighboring cell.

14. The method of claim 1, further comprising measuring, using a third downlink signal received at the first radio, a quality of the serving cell on a condition that the first or second quality of the serving cell is at or below the first, second, or third threshold.

15. The method of claim 1, further comprising determining a receiver type of the second radio on a condition that the second quality of the serving cell is at or below the second or third threshold value.

16. The method of claim 1, further comprising performing, via the first radio, a measurement of the neighboring cell on a condition that the second radio is not an orthogonal frequency-division multiplexing (OFDM) based radio or receiver or an on off keying (OOK) based radio or receiver.

17. The method of claim 1, further comprising determining, using a signal of a neighboring cell received by the second radio, a measurement of the neighboring cell on a condition that the second radio is an OFDM-based radio or receiver.

18. The method of claim 1, further comprising, on a condition that the second quality of the serving cell is below the second or third threshold value, performing neighboring cell measurements via the second radio, wherein the second radio is an OFDM-based radio or receiver.

19. The method of claim 1, further comprising, on a condition that the second quality of the serving cell is greater than the second or third threshold value, performing neighboring cell measurements via the first radio, wherein the second radio is an OOK-based radio or receiver.

20. The method of claim 1, further comprising determining, using a signal of a neighboring cell received by the second radio, a measurement of the neighboring cell on a condition that a quality of the serving cell being above the second or third threshold value.

21. The method of claim 1, wherein performing the cell reselection includes selecting the neighboring cell for the serving cell.

22. The method of claim 1, wherein the second radio comprises a low power wake-up radio or receiver, and wherein the second radio comprises an OFDM-based radio or receiver or an OOK-based radio or receiver.

23. A wireless transmit/receive unit (WTRU) comprising:

a first radio configured to receive a first downlink signal;

a second radio configured to receive a second downlink signal, wherein the second downlink signal comprises the first downlink signal or another downlink signal;

a processor configured to:

perform a first measurement of the first downlink signal;

determine a first quality of a serving cell based on the first measurement;

perform a second measurement of the second downlink signal based at least in part on the first quality of serving cell exceeding a first threshold value;

determine a second quality of the serving cell based on the second measurement;

determine a measurement configuration of at least one neighbor cell based at least in part on the second quality of the serving cell exceeding a second threshold value or a third threshold value; and perform cell reselection.

24. The WTRU of claim 23, wherein performing the cell reselection includes selecting the neighboring cell for the serving cell.

* * * * *